United States Patent
Peng et al.

(10) Patent No.: US 9,705,322 B2
(45) Date of Patent: Jul. 11, 2017

(54) DC POWER SUPPLY CONTROL SYSTEM AND CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhang-Long Peng, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 14/685,289

(22) Filed: Apr. 13, 2015

(65) Prior Publication Data

US 2016/0276930 A1 Sep. 22, 2016

(30) Foreign Application Priority Data

Mar. 19, 2015 (CN) .......................... 2015 1 0120501

(51) Int. Cl.
| | |
|---|---|
| *H02M 3/158* | (2006.01) |
| *H02J 1/06* | (2006.01) |
| *G06F 1/32* | (2006.01) |
| *G05F 3/02* | (2006.01) |

(52) U.S. Cl.
CPC .................. *H02J 1/06* (2013.01); *G06F 1/32* (2013.01); *H02M 3/158* (2013.01); *G05F 3/02* (2013.01)

(58) Field of Classification Search
CPC ........... H02M 3/158; H02M 2001/009; H02M 1/088; G05F 3/24; G05F 3/02; G06F 1/325; G06F 1/3215; G06F 1/3206; G06F 1/26; G06F 1/30; G06F 1/32; H02J 1/06
See application file for complete search history.

(56) References Cited

U.S. PATENT DOCUMENTS

| | | | | |
|---|---|---|---|---|
| 4,158,192 | A * | 6/1979 | Muto .................... | B60K 31/102 180/177 |
| 7,911,817 | B2 * | 3/2011 | Kasprzak .............. | H02M 3/335 363/146 |
| 2008/0191674 | A1 * | 8/2008 | Cheng ................... | H02M 3/156 323/282 |

(Continued)

*Primary Examiner* — Gustavo Rosario Benitez
(74) *Attorney, Agent, or Firm* — Steven Reiss

(57) ABSTRACT

A DC power supply control system includes a voltage conversion module configured to couple to a DC power supply and convert a DC voltage to a power voltage; a power port coupled to the voltage conversion module and configured to be coupled to a peripheral load; a switch module coupled to the voltage conversion module and configured to switch on/off the voltage conversion module; and a detection module coupled to the power port and configured to detect the peripheral load. When the detection module detects the peripheral load, the switch module switches on the voltage conversion module, allowing the DC voltage to be converted to the power voltage. Without a peripheral load being detected by the detection module, the switch module switches off the voltage conversion module. A DC power supply control circuit is further disclosed.

18 Claims, 3 Drawing Sheets

(56) References Cited

U.S. PATENT DOCUMENTS

| | | | | |
|---|---|---|---|---|
| 2009/0313494 A1* | 12/2009 | Wang | ............... | G06F 1/26 |
| | | | | 713/340 |
| 2011/0157939 A1* | 6/2011 | Wang | ............... | H02M 1/00 |
| | | | | 363/125 |
| 2012/0147635 A1* | 6/2012 | Martinelli | ............... | H02M 1/32 |
| | | | | 363/50 |
| 2012/0306435 A1* | 12/2012 | Tu | ............... | H02J 7/0052 |
| | | | | 320/107 |
| 2012/0326530 A1* | 12/2012 | Tang | ............... | G06F 1/3228 |
| | | | | 307/116 |
| 2013/0162222 A1* | 6/2013 | Ke | ............... | H02J 7/00 |
| | | | | 320/162 |
| 2014/0139029 A1* | 5/2014 | Gasparini | ............... | G06F 1/26 |
| | | | | 307/80 |
| 2014/0313782 A1* | 10/2014 | Shen | ............... | H02M 3/33507 |
| | | | | 363/15 |
| 2015/0123477 A1* | 5/2015 | Shen | ............... | G06F 1/26 |
| | | | | 307/52 |

* cited by examiner

DC POWER SUPPLY CONTROL SYSTEM AND CIRCUIT

FIELD

The subject matter herein generally relates to power supplies.

BACKGROUND

In many DC power supply circuits, a power port for a peripheral load, such as a USB power port, is converted directly from a DC power supply by a DC voltage output. The power port always outputs the DC voltage whether or not the peripheral load is connected to the power port.

BRIEF DESCRIPTION OF THE DRAWINGS

Implementations of the present technology will now be described, by way of example only, with reference to the attached figures.

DETAILED DESCRIPTION

Figure 1:
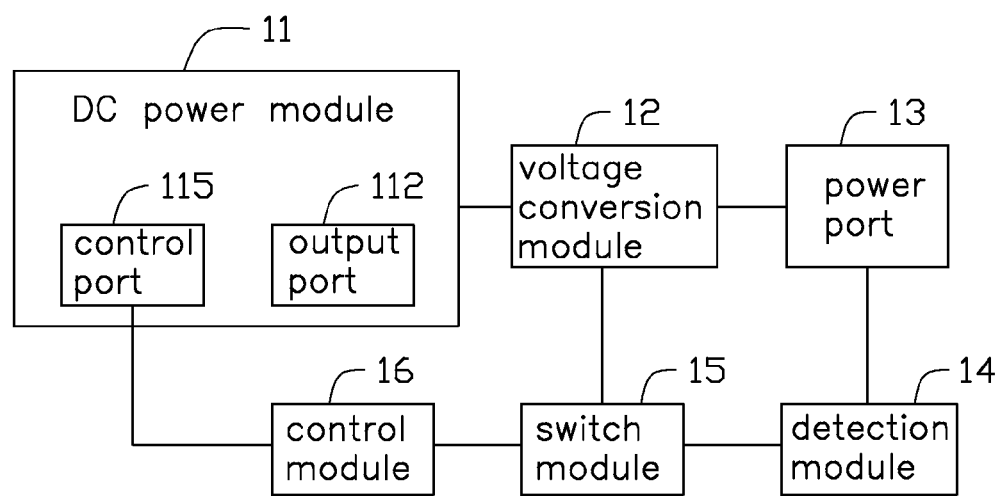
FIG. 1 is a block diagram of an embodiment of a DC power supply control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a DC power supply control system controlling a voltage output from a DC power module 11 in accordance with an embodiment. The DC power supply control system can include a voltage conversion module 12, a power port 13, a detection module 14, and a switch module 15.

The DC power module 11 can include an output port 112 and a control port 115. The output port 112 is coupled to the voltage conversion module 12 and configured to output a DC voltage.

The voltage conversion module 12 is configured to convert the DC voltage to a power voltage to be supplied to a peripheral load. In at least one embodiment, the peripheral load is a USB device, such as USB flash disk, portable power source, mobile hard disk drive, and the like.

The power port 13 is coupled to the voltage conversion module 12 and configured to be coupled to the peripheral load. The power voltage supplies power for the peripheral load via the power port 13.

The detection module 14 is coupled to the power port 13 and the switch module 15 and configured to detect if and when the power port 13 is coupled to the peripheral load. The switch module 15 is coupled to the voltage conversion module 12. When the detection module 14 detects a coupling to the peripheral load, the detection module 14 send a convert signal to the switch module 15, and the switch module 15 operates the voltage conversion module 12 to convert the DC voltage to the power voltage, and the power voltage is output to the peripheral load by the power port 13.

Before a detection by the detection module 14 of a coupling to the peripheral load, the switch module 15 cannot operate the voltage conversion module 12 to convert the DC voltage to the power voltage, being without the convert signal. Thus, the power voltage will be blocked without a connection between the power port 13 and the peripheral load.

The DC power supply control system further includes a control module 16.

The switch module 15 is coupled to the control module 16. The control module 16 is coupled to the control port 115 of the DC power module 11. When the switch module 15 receives the convert signal, the switch module 15 sends a control signal to the control module 16, the control port 115 controls the output port 112 to output the DC voltage according to the control signal, and the voltage conversion module 12 converts the DC voltage to the power voltage.

Until the detection module 14 detects the peripheral load, the control module 16 cannot receive the control signal, and thus the DC voltage remains cut off by the control port 115.

Figure 2:
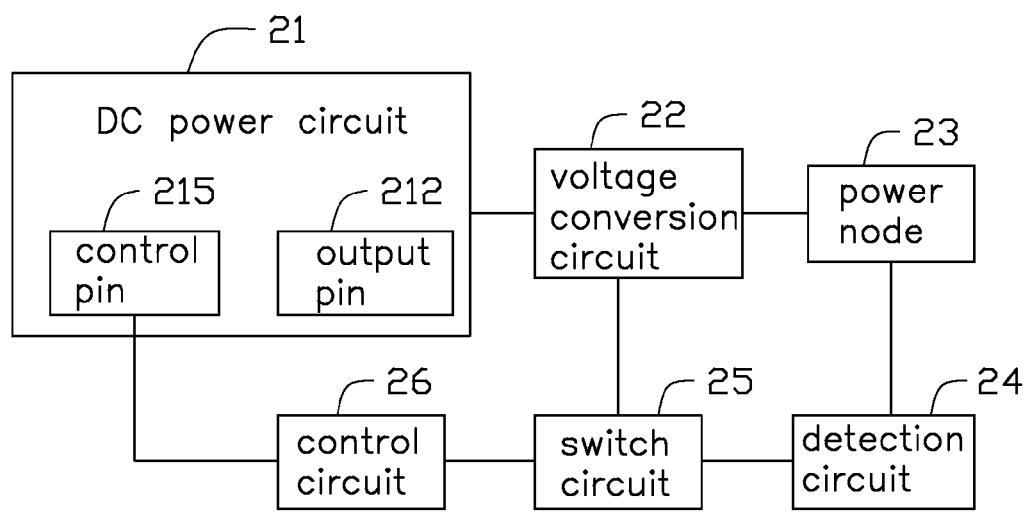
FIG. 2 is a block diagram of an embodiment of a DC power supply control circuit.

FIG. 2 illustrates a DC power supply control circuit controlling a voltage output from a DC power circuit 21 in accordance with an embodiment. The DC power supply control circuit can include a voltage conversion circuit 22, a power node 23, a detection circuit 24, and a switch circuit 25.

The DC power circuit 21 can include an output pin 212 and a control pin 215. The output pin 212 is configured to output the DC voltage.

Figure 3:
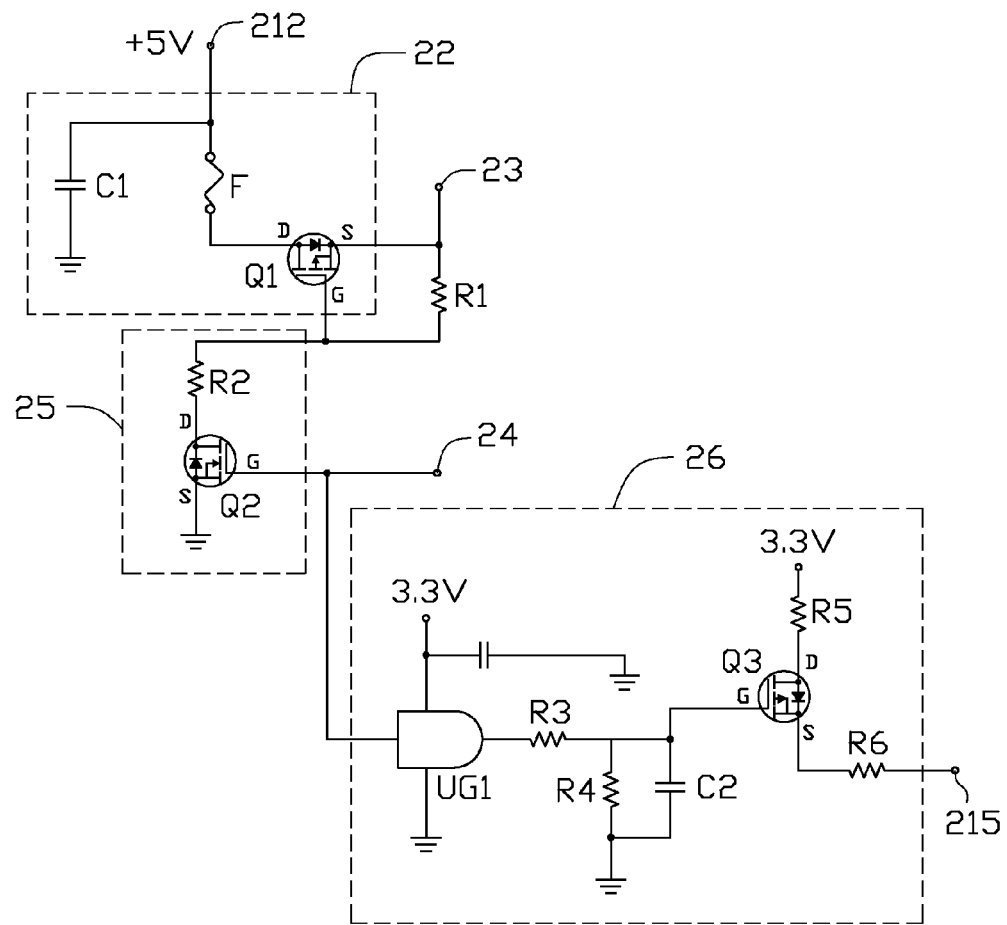
FIG. 3 is a circuit diagram of the DC power supply control circuit of FIG. 2 but without a DC power circuit and a detection circuit.

FIG. 3 illustrates that the voltage conversion circuit 22 is configured to convert the DC voltage to the power voltage and can include a fuse F and a first transistor Q1. A first end of the fuse F is coupled to the output pin 212 and grounded via a first capacitor C1. A second end of the fuse F is coupled to the drain electrode D of the first transistor Q1. The source electrode S of the first transistor Q1 is coupled to the power node 23. The power node 23 is coupled to the gate electrode G of the first transistor Q1 via a first resistor R1.

The power node 23 is configured to be coupled to the peripheral load. The voltage supplies power for the peripheral load via the power node 23.

The switch circuit 25 can include a second resistor R2 and a second transistor Q2. The gate electrode G of the first transistor Q1 is coupled to the drain electrode D of the second transistor Q2. The source electrode S of the second transistor Q2 is grounded. The gate electrode G of the second transistor Q2 is coupled to a signal pin POWER_EN of the detection circuit 24.

In at least one embodiment, the first transistor Q1 is a P type field-effect transistor (FET), and the second transistor Q2 is an N type FET.

The detection circuit 24 is coupled to the power node 23 and configured to detect whether the power node 23 is coupled to the peripheral load. When the detection circuit 24 detects the peripheral load, the signal pin POWER_EN sends out a high level signal, as a convert signal. In this position, the second transistor Q2 is switched on, the drain electrode D of the second transistor Q2 outputs a low level signal to switch on the first transistor Q1, and the power node 23 outputs to the peripheral load a high level power voltage converted from the voltage conversion circuit 22.

Until the detection circuit 24 detects the peripheral load, the signal pin POWER_EN sends out a low level signal. In this position, the second transistor Q2 is switched off, the first transistor Q1 is switched off, and the power voltage remains cut off by the voltage conversion circuit 22.

The DC power supply control circuit further includes a control circuit 26.

The control circuit 26 can include a NOT gate UG1 and a third transistor Q3. An input pin of the NOT gate UG1 is coupled to the signal pin POWER_EN, and an output pin of NOT gate UG1 is coupled to the gate electrode G of the third transistor Q3 via a third resistor. The gate electrode G of the third transistor Q3 is grounded via a second capacitor C2 and a fourth resistor R4 in parallel to the second capacitor C2. The drain electrode D of the third transistor Q3 is coupled to a high level voltage, such as +3.3V, via a fifth resistor R5. The source electrode S of the third transistor Q3 is coupled to the control pin 215 via a sixth resistor R6. The type of the third transistor Q3 is same as that of the first transistor Q1. In the illustrated embodiment, the type of the third transistor Q3 is a P type FET.

When the signal pin POWER_EN sends out the high level signal as a convert signal, the NOT gate UG1 outputs a low level signal to switch on the third transistor Q3, the source electrode S of the third transistor Q3 outputs a high level signal to the control pin 215 to allow the output pin 212 to output the DC voltage.

When the signal pin POWER_EN sends out the low level signal, the NOT gate UG1 outputs a high level signal to switch off the third transistor Q3, to cut off the DC voltage from the output pin 212.

In another embodiment, the first transistor Q1 is an N type FET, the second transistor Q2 is a P type FET, and the third transistor Q3 is an N type FET. When the detection circuit 24 detects the peripheral load, the signal pin POWER_EN sends out a low level signal as a convert signal to switch on the first transistor Q1, the second transistor Q2, and the third transistor Q3. Until a peripheral load is detected by the detection circuit 24, the signal pin POWER_EN sends out a high level signal as a convert signal to switch off the first transistor Q1, the second transistor Q2, and the third transistor Q3.

The embodiments shown and described above are only examples. Many details are often found in the art such as the other features of a DC power supply control system and circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A direct current (DC) power supply control circuit comprising:
   a voltage conversion circuit couplable to a DC power circuit and configured to convert a DC voltage, received from the DC power circuit, to a power voltage;
   a power node coupled to the voltage conversion circuit and being connectable to a peripheral load;
   a switch circuit coupled to the voltage conversion circuit and configured to switch on or off the voltage conversion circuit;
   a control circuit coupled to the switch circuit, and
   a detection circuit coupled to the power node and configured to detect whether the power port couples to the peripheral load;
   wherein the control circuit comprises a NOT gate, an input pin of the NOT gate is coupled to the switch circuit and the detection circuit, an output pin of the NOT gate is coupled to the DC power circuit;
   wherein the voltage conversion circuit comprises a fuse, the fuse is coupled to the output pin;
   wherein when the detection circuit detects the peripheral load, the detection circuit drives the switch circuit to switch on the voltage conversion circuit, allowing the DC voltage to be converted to the power voltage; and when without a peripheral load is detected by the detection module, the detection circuit drives the switch circuit to switch off the voltage conversion circuit, preventing the DC voltage from being converted to the power voltage.

2. The DC power supply control circuit of claim 1, wherein the voltage conversion circuit further comprises a first transistor, a first end of the fuse is coupled to the output pin, a second end of the fuse is coupled to a drain electrode of the first transistor, a source electrode of the first transistor is coupled to the power node, the power node is coupled to a gate electrode of the first transistor via a first resistor.

3. The DC power supply control circuit of claim 2, wherein the first end of the fuse is grounded via a first capacitor.

4. The DC power supply control circuit of claim 2, wherein the switch circuit comprises a second resistor and a second transistor, the gate electrode of the first transistor is coupled to a drain electrode of the second transistor, a source electrode of the second transistor is grounded, and a gate electrode of the second transistor is coupled to a signal pin of the detection circuit.

5. The DC power supply control circuit of claim 4, wherein each of the first transistor and the second transistor is a field-effect transistor (FET), and the type of the first transistor is opposite to the type of the second transistor; when the detection circuit detects the peripheral load, the signal pin sends out a convert signal to switch on the first transistor and the second transistor, to switch on the switch circuit and the voltage conversion circuit; and when the detection circuit detects without the peripheral load, the first transistor and the second transistor are switched off, to switch off the switch circuit and the voltage conversion circuit.

6. The DC power supply control circuit of claim 5, wherein the control circuit is coupled to the signal pin, the control circuit is coupled to a control pin of the DC power circuit and configured to switch on or off the DC power circuit; when the control pin sends out the convert signal, the control circuit controls the control pin to allow the DC power circuit to output the DC voltage; and when the control pin sends without the convert signal, the control circuit controls the control pin to switch off the DC power circuit.

7. The DC power supply control circuit of claim 6, wherein the control circuit further comprises a third transistor, the input pin of the NOT gate is coupled to the signal pin, the output pin of NOT gate is coupled to the gate electrode of the third transistor via a third resistor, the gate electrode of the third transistor is grounded via a fourth resistor, the drain electrode of the third transistor is coupled to a high level voltage via a fifth resistor, and the source electrode of the third transistor is coupled to the control pin via a sixth resistor.

8. The DC power supply control circuit of claim 7, wherein the gate electrode of the third transistor is grounded via a second capacitor in parallel to the fourth resistor.

9. The DC power supply control circuit of claim 7, wherein the third transistor is a FET, and the type of the first transistor is same as the type of the third transistor; when the signal pin sends out the convert signal, the third transistor is switched on; and when the signal pin sends out without the convert signal, the third transistor is switched off.

10. A direct current (DC) power supply control circuit comprising:
   a voltage conversion circuit couplable to a DC power circuit and configured to convert a DC voltage, received from the DC power circuit, to a power voltage;
   a power node coupled to the voltage conversion circuit and being connectable to a peripheral load;
   a switch circuit coupled to the voltage conversion circuit and configured to switch on or off the voltage conversion circuit;
   a detection circuit coupled to the power node and configured to detect whether the power port couples to the peripheral load; and
   a control circuit coupled to the detection circuit and configured to switch on or off the DC power circuit;
   wherein the voltage conversion circuit comprises a fuse, the fuse is coupled to the output pin;
   wherein the control circuit comprises a NOT gate, an input pin of the NOT gate is coupled to the switch circuit and the detection circuit, an output pin of the NOT gate is coupled to the DC power circuit, when the detection circuit detects the peripheral load, the detection circuit drives the control circuit to switch on the DC power circuit, allowing the DC power circuit to output the DC voltage; and when without the peripheral load is detected by the detection circuit, the detection circuit drives the control circuit to switch off the DC power circuit, to cut off the DC voltage.

11. The DC power supply control circuit of claim 10, wherein the voltage conversion circuit further comprises a first transistor, a first end of the fuse is coupled to the output pin, a second end of the fuse is coupled to a drain electrode of the first transistor, a source electrode of the first transistor is coupled to the power node, the power node is coupled to a gate electrode of the first transistor via a first resistor.

12. The DC power supply control circuit of claim 11, wherein the first end of the fuse is grounded via a first capacitor.

13. The DC power supply control circuit of claim 11, wherein the switch circuit comprises a second resistor and a second transistor, the gate electrode of the first transistor is coupled to a drain electrode of the second transistor, a source electrode of the second transistor is grounded, and a gate electrode of the second transistor is coupled to a signal pin of the detection circuit.

14. The DC power supply control circuit of claim 13, wherein each of the first transistor and the second transistor is a field-effect transistor (FET), and the type of the first transistor is opposite to the type of the second transistor; when the detection circuit detects the peripheral load, the signal pin sends out a convert signal to switch on the first transistor and the second transistor, to switch on the switch circuit and the voltage conversion circuit; and when the detection circuit detects without the peripheral load, the first transistor and the second transistor are switched off, to switch off the switch circuit and the voltage conversion circuit.

15. The DC power supply control circuit of claim 14, wherein the control circuit is coupled to a control pin of the DC power circuit; when the control pin sends out the convert signal, the control circuit controls the control pin to allow the DC power circuit to output the DC voltage, and the switch circuit switches on the voltage conversion circuit, allowing the DC voltage to be converted to the power voltage; and when the control pin sends without the convert signal, the control circuit controls the control pin to switch off the DC power circuit, and the switch circuit switches off the voltage conversion circuit, preventing the DC voltage from being converted to the power voltage.

16. The DC power supply control circuit of claim 15, wherein the control circuit further comprises a third transistor, the input pin of the NOT gate is coupled to the signal pin, the output pin of NOT gate is coupled to the gate electrode of the third transistor via a third resistor, the gate electrode of the third transistor is grounded via a fourth resistor, the drain electrode of the third transistor is coupled to a high level voltage via a fifth resistor, and the source electrode of the third transistor is coupled to the control pin via a sixth resistor.

17. The DC power supply control circuit of claim 16, wherein the gate electrode of the third transistor is grounded via a second capacitor in parallel to the fourth resistor.

18. The DC power supply control circuit of claim 16, wherein the third transistor is a FET, and the type of the first transistor is same as the type of the third transistor; when the signal pin sends out the convert signal, the third transistor is switched on; and when the signal pin sends without the convert signal, the third transistor is switched off.

* * * * *